United States Patent [19]
Elmore

[11] 3,994,377
[45] Nov. 30, 1976

[54] OVERRUNNING CLUTCH RETAINER AND ROLLER ASSEMBLY

[75] Inventor: J. Russell Elmore, New Hartford, Conn.

[73] Assignee: The Torrington Company, Torrington, Conn.

[22] Filed: Nov. 6, 1975

[21] Appl. No.: 629,276

Related U.S. Application Data
[63] Continuation-in-part of Ser. No. 458,111, April 5, 1974, Pat. No. 3,942,616.

[52] U.S. Cl. .................................................. 192/45
[51] Int. Cl.² ................................................ F16D 41/06
[58] Field of Search ..................... 192/45; 188/82.84

[56] References Cited
UNITED STATES PATENTS

| | | |
|---|---|---|
| 1,034,690 | 8/1912 | Cleal et al. ......................... 192/45 X |
| 3,086,632 | 4/1963 | Wade et al. ............................ 192/45 |
| 3,482,667 | 12/1969 | Hein ..................................... 192/45 |

*Primary Examiner*—Allan D. Herrmann
*Attorney, Agent, or Firm*—Frank S. Troidl

[57] ABSTRACT

This novel clutch retainer and roller assembly comprises at least one plate to which are attached a plurality of circumferentially separated spring biasing tab members. Each tab extends into a completely hollow roller or a roller having a recess at at least one end. The tabs bias the rollers toward locking engagement between the clutch cam surfaces and the shaft or inner race.

4 Claims, 6 Drawing Figures

OVERRUNNING CLUTCH RETAINER AND ROLLER ASSEMBLY

This application is a continuation in part application of my co-pending application Ser. No. 458,111 filed Apr. 5, 1974; now U.S. Pat. No. 3,942,616, and entitled: OVERRUNNING CLUTCH AND RETAINER.

This invention relates to overrunning clutches. More particularly, this invention is a new and novel retainer and roller assembly for use in overrunning roller clutches.

For an overrunning roller clutch of a particular size, it is desirable to have as many rollers as possible in the space between the shaft and the clutch outer case. In general, the more rollers that can be fit in a clutch of a particular size, the greater the torque capacity of the clutch.

Clutches are used in many different forms and for many different purposes. For some purposes a full complement clutch; that is a clutch without any biasing springs at all, is quite adequate. In other cases, a modified full complement clutch with only one or two biasing springs may be used satisfactorily. Such a clutch is shown in U.S. Pat. No. 3,737,015. However, under most circumstances, these types of full complement clutches have inconsistent and non-uniform lockup and also non-uniform roller loading and stressing, since the rollers that lockup first carry more load than the rollers which lockup later.

I have invented a new and novel retainer construction which permits the manufacturer to use a full complement of rollers in an overrunning clutch and permits each roller to be individually biased. This will provide a clutch which has a maximum possible clutch torque capacity for the given space available, and will provide a clutch which has more consistent and uniform lockup for uniform roller loading and stressing than that obtainable by the other known full complement overrunning clutches. Most uniform loading will result in a lower maximum stress in the most heavily loaded roller and thereby will result in longer life of the clutch due to decreased rate of metal fatigue and failure of the clutch members.

Briefly described, my invention is a new clutch retainer and roller assembly which comprises at least one end plate with a plurality of circumferentially spaced biasing tab members extending from the end plate. The tab members extend into the at least partially hollow rolling members located in the annular space between the clutch casing and the shaft or inner race.

The invention as well as its many advantages may be further understood by reference to the following detailed description and drawings in which.

In the various figures, like parts are referred to by like numbers.

Figure 1:
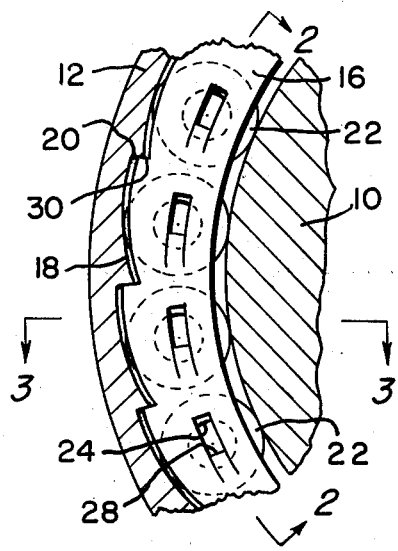
FIG. 1 is a front view, partly in section, of an overrunning roller clutch showing one embodiment of the new retainer and roller assembly.
Figure 2:
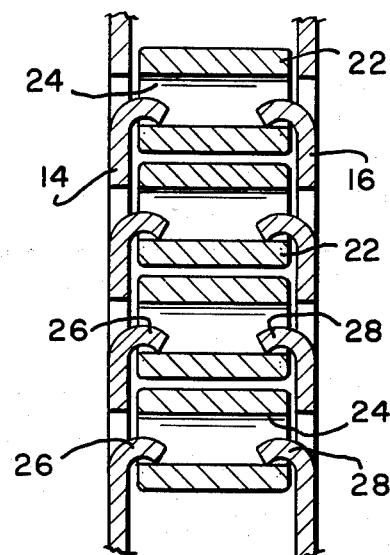
FIG. 2 is a view looking radially inward at the roller and retainer on the shaft with the outer clutch case removed, and showing the rollers in section.
Figure 3:
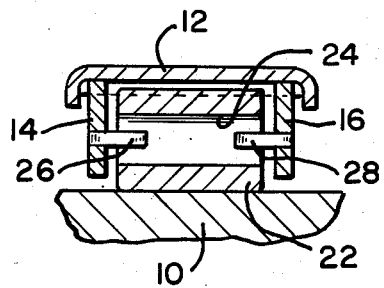
FIG. 3 is a view taken along lines 3—3 of FIG. 1 and in the direction of the arrows.

Referring to the drawings, and more particularly to FIGS. 1 through 3, my new retainer is shown positioned in a space between a shaft or inner race 10 and a clutch outer member 12. The inside diameter of the outer case 12 is greater than the outside diameter of the shaft 10.

My new retainer comprises a first end plate 14 and a second end plate 16 (see FIGS. 2 and 3). The end plates are longitudinally separated along the shaft 10 within the clutch case 12.

The inside perimeter of the outer case 12 has a plurality of clutch cam surfaces each including a ramp 18 and a backstop surface 20. A plurality of rollers 22, one for each ramp, is retained by the retainer end plates between the shaft 10 and the outer case 12. The rollers 22 should be at least partially hollow. In the embodiments shown in FIGS. 1 through 3, the rollers 22 are completely hollow, being provided with cylindrical bores 24. Relative rotation of the shaft in the outer case in a direction such that the rollers are moved down the ramps toward the area of increasing space adjacent to stops 20, will cause the shaft and outer case to be in the unlocked or overrunning condition in which they can have relative rotation. Relative rotation of the shaft and case in the opposite direction such that the rollers tend to move up the ramp toward the area of decreasing space between the shaft and the outer case causes lockup of the shaft and the outer case through wedging of the rolling members between shaft and case, and prevents any further rotation of the shaft with respect to the outer case.

Each retainer end plate includes a plurality of circumferentially spaced biasing members such as the biasing leaf spring tabs 26 and 28 lanced from the end plates 14 and 16, respectively. Leaf spring tabs 26 on end plate 14 extend substantially axially toward the opposite end plate 16; leaf spring tabs 28 on end plate 16 extend substantially axially toward end plate 14. Each leaf spring 26 is directly opposite a leaf spring 28. The free ends of an opposed mating pair of leaf springs engage the inside surface of the cylindrical bore 24 in roller 18, and urge at least one of the rollers toward lockup position on the clutch ramp. This arrangement permits a maximum number of rollers for a given size clutch.

The radially outward surface of the end plates 14 and 16 are provided with stop surfaces such as surfaces 30 on the end plate 16 (see FIG. 1). The stop surfaces 30 on the end plates are positioned to engage the backstop surface 20 of the outer case to properly circumferentially position the spring tabs and to prevent relative rotation of the retainer with respect to the outer case.

It is possible to make an overruning clutch with my new retainer utilizing less than a full complement of mating pairs of springs to urge the rolling members toward the lockup position, with some rollers pushing other rollers. It is also possible to space the rollers much further apart than the close spacing of the rollers illustrated in the figures. However, one prime advantage of my new overrunning clutch retainer and roller assembly is that each individual roller, separated from each roller next to it by only an extremely slight space to accommodate manufacturing inaccuracies and tolerances in the clutch and in a mechanism in which it is used, is individually and continuously biased toward the wedging lockup position. When relative motion of shaft and case is in the lockup direction with individual biasing, the lockup is immediate and relatively uniform on all rollers; and loading and stressing of clutch components are also uniform. Thus, this invention provides the art with a new full complement overrunning clutch with a maximum number of rollers for any particular size; which clutch does not suffer from the uneven stress and wear which is often found in currently known full complement overrunning clutches that have non-uniform roller lockup and non-uniform roller loading and stressing.

Figure 4:
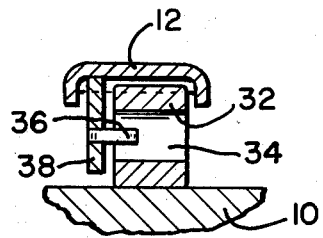
FIG. 4 is a sectional view showing the use of a retainer with a single end plate with the biasing tabs extending into short hollow rollers.

In the embodiment shown in FIG. 4, the new overrunning clutch retainer and roller assembly includes a plurality of short rollers 32, each having a cylindrical bore 34. The circumferentially separated spring tabs 36 (only one shown in FIG. 4) extend from a single end plate 38. The opertion of the embodiment of FIG. 4 is similar to the operation of the embodiments of FIGS. 1 through 3 in that the spring tabs 36 exert a bias against the inside wall of the bore 34, urging the rollers toward lockup condition.

Figure 5:
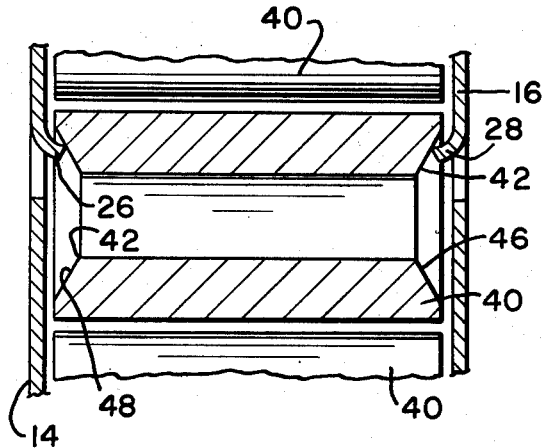
FIG. 5 is a sectional view, on an enlarged scale, showing the use of completely hollow rollers with a slightly different hollow configuration than the embodiment of the rollers in FIGS. 1 through 4.

Referring to FIG. 5, the biasing springs 26 and 28 extend into a hollow roller 40. Each spring engages a tapering side 42 of the inner wall of the hollow roller and urges a hollow roller toward lockup position on the clutch ramps. Alternatively, the spring may extend into the cylindrical bore 44 and engage the interior cylindrical wall of said bore. Also the end counterbores 46 and 48 may be cylindrical with the spring on contact with the end counterbore walls.

Figure 6:
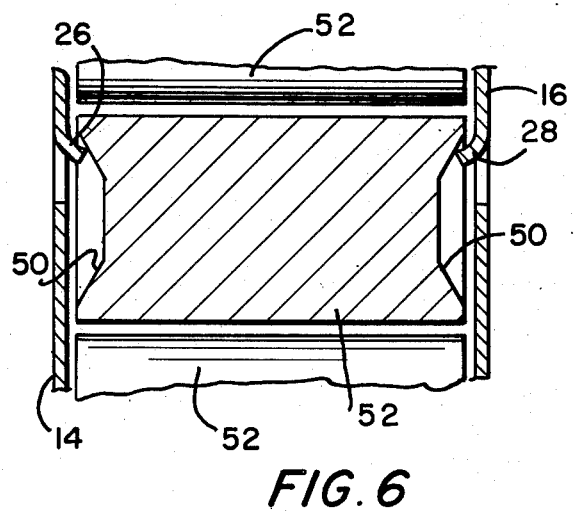
FIG. 6 is a sectional view similar to FIG. 5 showing hollow ended rollers with my new invention.

In the embodiment shown in FIG. 6, each spring 26 and 28 engages a tapering side surface 50 of a hollowed roller 52 to urge the hollow ended roller toward lockup position on the clutch ramp. Alternatively, side surfaces 50 may be cylindrical instead of tapered.

Various other shapes of partially hollowed rollers or completely hollow rollers may be used, without departing from the scope of this invention.

A unique feature of this invention is that when the shaft is installed in the clutch assembly of outer case rollers and retainer, the rollers may push the leaf spring tabs far enough that the stress level in the springs exceeds the yield point, and the springs will be permanently but slightly deformed; yet they will still resiliently bias the rollers toward lockup position as the stress level drops below the yield point of the material.

While the spring tabs have been illustrated as axially extending plane figures, they may be curved equally well to suit particular needs, and often will be so curved.

I claim:

1. In a clutch with an inner member and an outer member of greater inside diameter than the outside diameter of the inner member thereby providing an annular space between said inner and outer members, with one of the said members having a cam surface, an overrunning clutch retainer and roller assembly comprising:
    a plurality of at least partially hollow rollers in said annular space; and a retainer consisting of at least one end plate positioned in said annular space; and a plurality of circumferentially spaced biasing tab members connected to the end plate, each biasing tab member extending into an at least partially hollow roller.

2. The overrunning clutch retainer and roller assembly in accordance with claim 1 wherein there are two longitudinally spaced end plates; and each end plate has a plurality of circumferentially spaced spring biasing members extending axially toward the other end plate.

3. The overrunning clutch retainer and roller assembly in accordance with claim 2 wherein each hollow roller is completely hollow and has a substantially cylindrical bore extending longitudinally therethrough.

4. An overrunning clutch retainer and roller assembly in accordance with claim 2 wherein each rolling member is partially hollow including recesses in each of the ends of the rolling members.

\* \* \* \* \*